United States Patent [19]
Gerlach et al.

[11] Patent Number: 5,471,647
[45] Date of Patent: Nov. 28, 1995

[54] METHOD FOR MINIMIZING CROSS-TALK IN ADAPTIVE TRANSMISSION ANTENNAS

[75] Inventors: Derek Gerlach, Los Altos Hills; Arogyaswami J. Paulraj, Stanford, both of Calif.

[73] Assignee: The Leland Stanford Junior University, Stanford, Calif.

[21] Appl. No.: 46,631

[22] Filed: Apr. 14, 1993

[51] Int. Cl.$^6$ ........................................ H04B 1/10
[52] U.S. Cl. ................... 455/63; 455/67.3; 455/69; 455/103
[58] Field of Search .................. 455/62, 63, 67.3, 455/69, 70, 101, 103; 375/58, 60

[56] References Cited

U.S. PATENT DOCUMENTS

| | | | |
|---|---|---|---|
| 4,495,648 | 1/1985 | Giger | 455/69 |
| 4,811,421 | 3/1989 | Havel et al. | 455/70 |

FOREIGN PATENT DOCUMENTS

| | | |
|---|---|---|
| 2-027802 | 1/1990 | Japan . |
| 3-234128 | 10/1991 | Japan . |

OTHER PUBLICATIONS

"A Comparison of Adaptive Algorithms Based on the Methods of Steepest Descent and Random Search", by Bernard Widrow, Fellow, IEEE, & John M. McCool, Senior Member, IEEE; *IEEE Transactions on Antennas and Propagation*, vol. AP-24, No. 5, Sep. 1976, pp. 615–637.

*Primary Examiner*—Reinhard J. Eisenzopf
*Assistant Examiner*—Andrew Faile
*Attorney, Agent, or Firm*—Thomas J. McFarlane

[57] ABSTRACT

A method is disclosed for using feedback signals (32) to optimize the directional properties of information signals (19) with respect to their intended receivers (16), where information signals (19) are applied to the transmitting elements (14) of a transmitting antenna array (12). Feedback signals (32) generated at receivers (16) by probing signals (17) are monitored, and the weight matrix with which signals (17) are distributed among array elements (14) is adjusted according to feedback signals (32) to minimize cross-talk. Information signals (18) transmitted according to an optimized weight matrix will also have reduced cross-talk. A weight matrix may be optimized by perturbing an initial weight matrix, calculating an error function from the feedback signals (32) produced by each perturbed weight matrix, estimating the direction of an extremum from the error functions, and adjusting the initial weight matrix in that direction. Alternatively, a gain matrix for the transmitting array may be explicitly determined by sequentially exciting each transmitting element (14) and measuring the resultant feedback signals (32). These are then used to calculate the weight matrix that eliminates cross-talk.

18 Claims, 4 Drawing Sheets

METHOD FOR MINIMIZING CROSS-TALK IN ADAPTIVE TRANSMISSION ANTENNAS

TECHNICAL FIELD

This invention relates to methods for multiplexing signals transmitted from an antenna array to multiple receivers, and in particular to the use of feedback from the receivers to minimize cross-talk among the received signals.

BACKGROUND ART

Wireless communication systems may use spatial multiplexing techniques wherein a single transmitter simultaneously emits multiple information signals, each of which is intended for one of a number of spatially separated receivers. The directional properties of transmitting antenna arrays are exploited in such systems to generate a beampattern for each signal which is directed towards its intended receiver. For example, such transmitting arrays are used in satellites to beam different signals to different receiving locations.

By adjusting the amplitude and phase at which a signal is applied to the elements of the transmitting array, the gain of the signal can be maximized in the direction of its intended receiver and minimized in the directions corresponding to other receivers. Where sufficient information is available about the transmission channels between the transmitting array and each receiver, a complimentary null beampattern can be generated for each signal. Such a beampattern has unit gain in the direction of the intended receiver and zero gain in the directions of all other receivers.

A frequent problem with such systems is that the information available about the propagation environment is insufficient to produce the desired beampattern. Uncertainties in the response of the transmitting antenna array, the locations of the intended receivers, and the nature and location of scatterers in the vicinity of the array, limit the information available about the transmission channel. In such cases, the beampattern formed has non-zero gain in the direction of unintended receivers, leading to cross-talk among signals. Cross-talk degrades the quality of the signal at its intended receiver, and in the worst case, may wash it out altogether.

DISCLOSURE OF INVENTION

The present invention is a method for using feedback signals (32) to optimize the directional properties of information signals (19) transmitted to multiple receivers (16) from a transmitting antenna array (12). Feedback signals (32) generated by probing signals (17) provide information about the propagation environment of an array/receiver system (50), which is used to determine a weight matrix W for the distribution of information signals (19) among transmission elements (14) that minimizes cross-talk.

For example, probing signals (17) may be transmitted with a selected weight matrix W, and the resulting feedback signals (32) used to determine the transfer functions $a_{kj}$ for each array-element/receiver pair. These transfer functions are then used to calculate a new weight matrix W' for the distribution of information signal (19) among the array-elements (14) that minimizes cross-talk. By choosing the number of array elements (14) to be at least as great as the number of receivers (16), the optimal distribution of information signal complex amplitudes can be readily determined using a variety of standard techniques.

Yet another approach is applying a series of perturbations to a weight matrix W, and monitoring the cross-talk levels via feedback signals (32). The feedback signals (32) are used to estimate the direction in which weight matrix W must be adjusted to reduce cross-talk.

Alternatively, the desired weight matrix W can be calculated directly from the feedback signals (32).

DETAILED DESCRIPTION OF THE PREFERRED EMBODIMENTS

Feedback is used in electronic circuits to improve device performance by providing a sample of an output signal back to the signal producing device. The device adjusts its operation based on this feedback signal to improve the output signal. The present invention extends the use of feedback to wireless communication systems. In particular, a method is disclosed for using feedback to minimize cross-talk among different transmitted signals.

Figure 1:
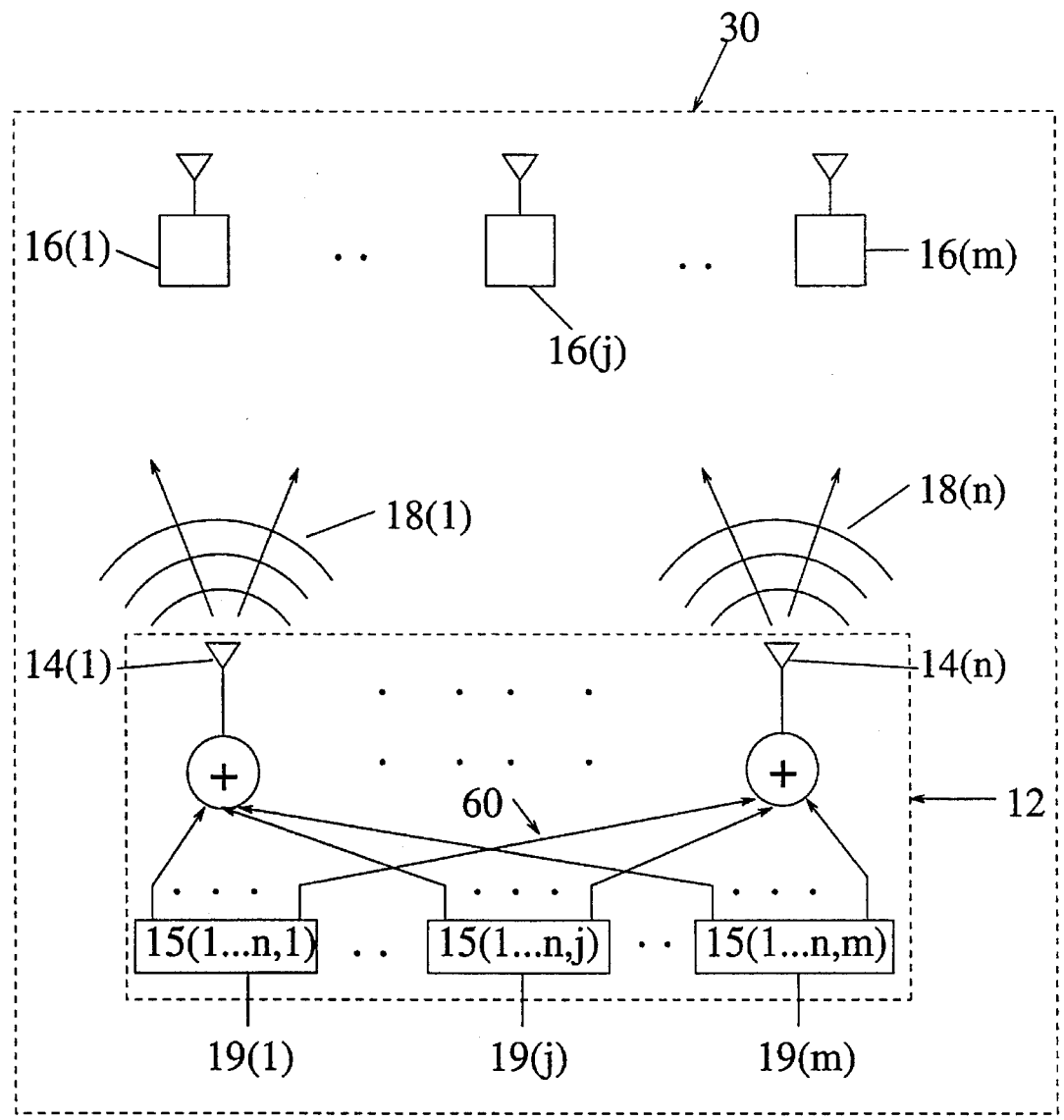
FIG. 1 is a schematic diagram of a conventional wireless communication system (30) comprising a transmitting array (12) with transmitting elements (14) and multiple receivers (16).

Referring to FIG. 1, there is shown a conventional transmitting array 12 comprising transmission elements 14(1), 14(2), ... 14(n) and receivers 16(1), 16(2) ... 16(m). Information signals 19(1), 19(2) ... 19(m) excite transmitting elements 14(1)–14(n) collectively, giving rise to transmission signals 18 which are detected by receivers 16(1)–16(m), respectively. Here, m is the total number of receivers 16 and also the number of information signals 18, and n is the total number of transmitting elements 14. Receivers 16 are located in distinct directions with respect to transmitting array 12, and their angular separation provides a way to multiplex information signals 19. This is a means by which information signals 19 are multiplexed in addition to other multiplexing techniques such as frequency, time, or code.

Information signals 19 are directed toward their intended receivers 16 by adjusting the amplitudes and phases (complex amplitudes) with which each information signal 19 is applied to transmission elements 14. For example, transmitted signals 18(1) . . . 18(n) are generated at elements 14(1)–14(n), respectively, by applying information signals 19(1)–19(m) to elements 14(1)–14(n) with selected complex amplitudes 15(1,1), 15(1,2) . . . 15(n–1,m), 15(n,m) through connections 60. Complex amplitudes 15 form the elements of a n×m weight matrix W. Interaction among resulting signals 18(1)–18(n) directs information signals 19 to their intended receivers 16. Here, j is an integer index ranging from 1 through m, and has been used to designate a representative information signal 19(j) and its complex amplitudes 15(1,j)–15(n,j).

The degree of alignment of information signals 19 toward their corresponding receivers 16 depends on the number of transmitting elements 14. Alignment of information signals 19 can be more effectively controlled when more transmitting elements 14 are used. In particular, a complimentary null beampattern can only be determined if the number of elements 14 is greater than or equal to the number of receivers 16. However, even under these circumstances, changes in the location of receivers 16 or changes in the scattering environment will necessitate periodic reoptimization of complex amplitudes 15 comprising weight matrix W.

Figure 2A:
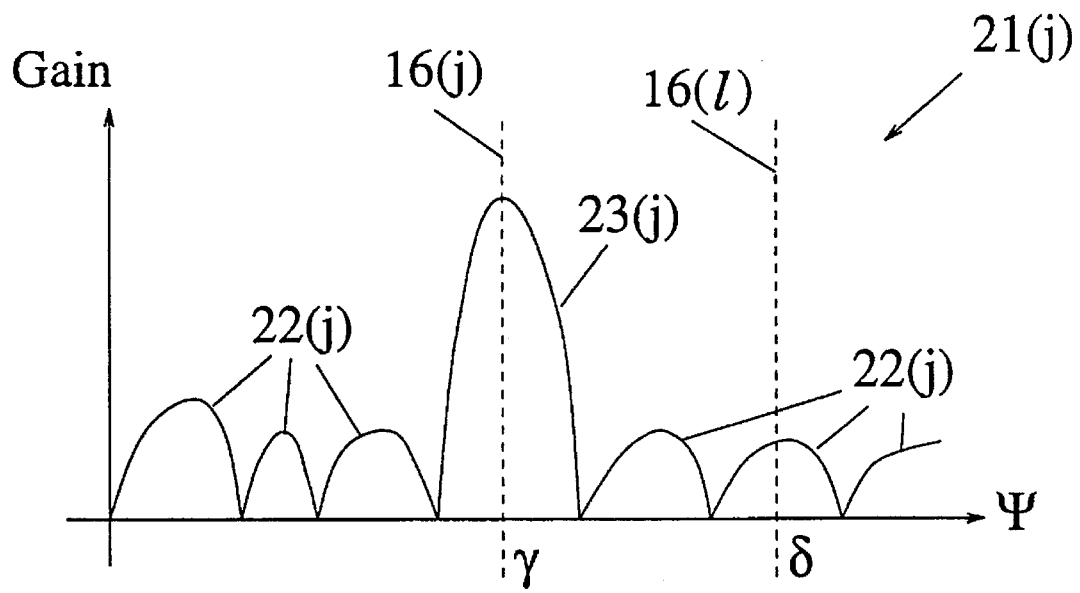
FIG. 2A is a schematic representation of a beampattern (21) without feedback, having a primary lobe (23) and secondary lobes (22), as a function of angle $\Psi$ with respect to transmitter array (12).

Referring to FIG. 2A, there is shown a beampattern 21(j) corresponding to information signals 19(j) as a function of angle with respect to transmitting array 12. Each information signal 19 will have its own beampattern 21 generated by interference between transmission signals 18. A primary lobe 23(j) at angle γ is directed toward receiver 16(j) also at angle γ with respect to array 12, and side lobes 22(j) appear at a series of other angles. Receivers 16 detect any signal 19 which has a non-zero amplitude in their direction. Thus, receiver 16(1) at angle δ detects the non-zero amplitude of side lobe 22(j) at angle δ. Receiver 16(1) thus detects signal 19(j) through side lobe 22(j), leading to cross-talk.

Figure 2B:
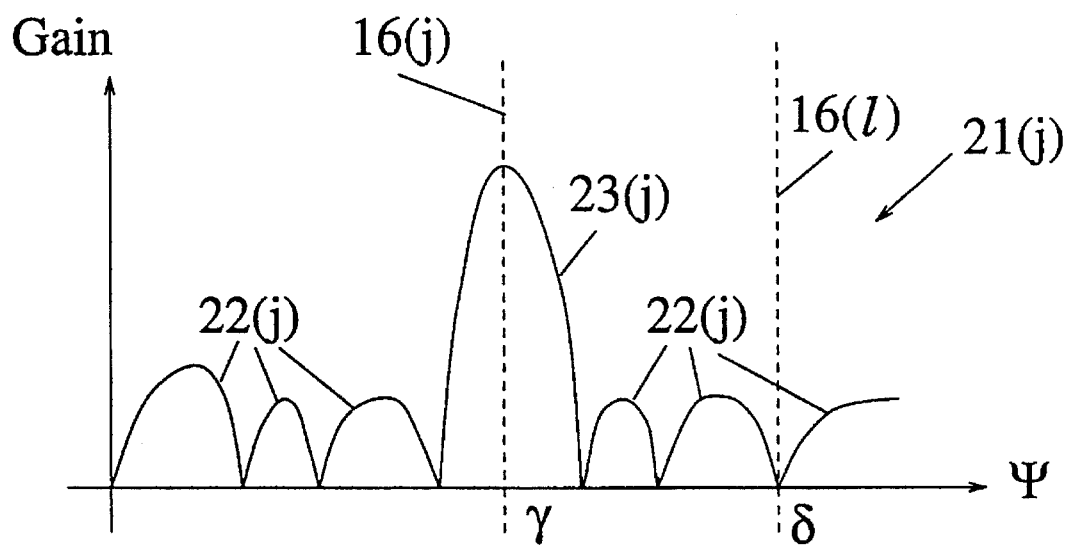
FIG. 2B is a schematic representation of a beampattern (21) with feedback, having primary lobe (23) and secondary lobes (22), as a function of angle $\Psi$ with respect to transmitter array (12).

The method of the present invention uses feedback signals 32 to adjust the amplitudes and phases 15 with which signals 19 are applied to transmitting elements 14 so that cross-talk is minimized. Referring now to FIG. 2B, there is shown a complimentary null beampattern 21 generated by the method of the present invention. Null beampattern 21 has a primary lobe 23(j) with unit gain at angle γ, in the direction of intended receiver 16(j), and side lobes 22(j) with nulls in the direction of all remaining receivers 16(1) where 1≠j.

Figure 3A:
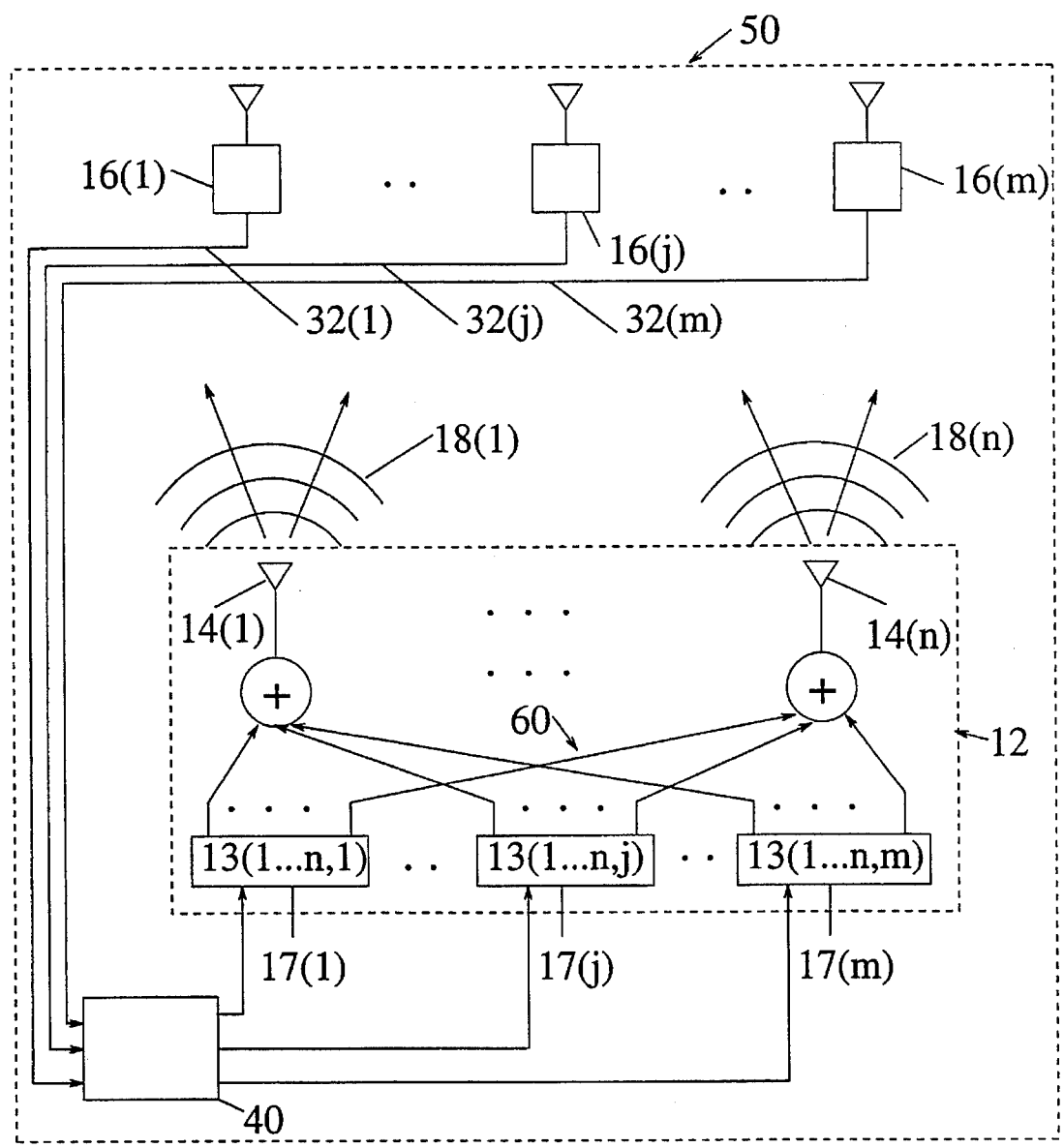
FIG. 3A is a schematic diagram of a wireless communication system (50) including feedback signals (32) and probing signals (17) in accordance with the present invention.

Referring to FIG. 3A, there is shown a schematic diagram of a transmitting array system 50, including feedback signals 32(1), 32(2) . . . 32(m) and a weight matrix W which comprises complex amplitudes 13(1,1) . . . 13(n,m). Feedback signals 32 originate at receivers 16 in response to probing signals 17 applied to transmitting elements 14, according to complex amplitudes 13. Feedback signals 32 are conveyed to weight computer 40 in array 12 for processing.

Figure 3B:
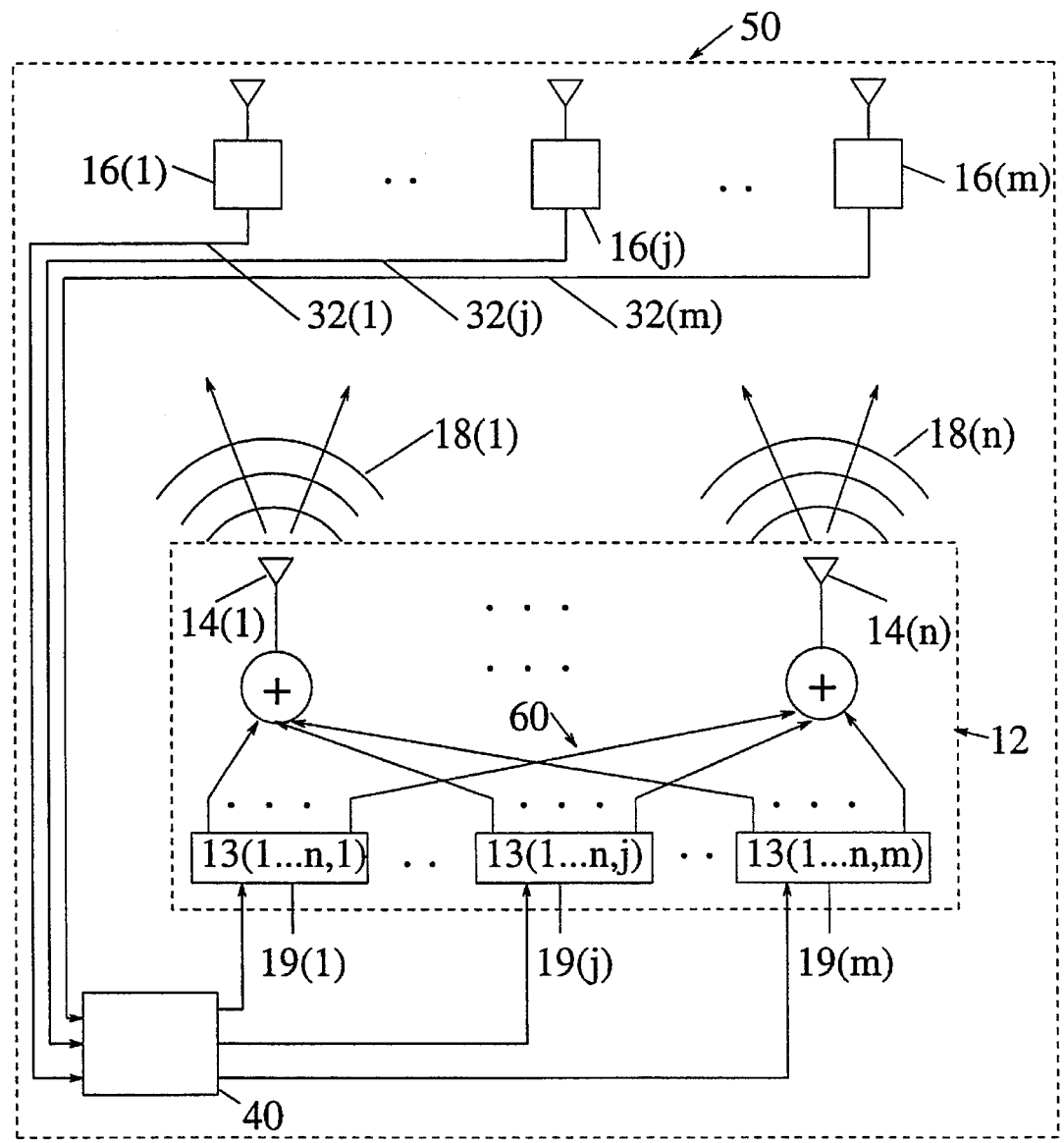
FIG. 3B is a schematic diagram of a wireless communication system (50) including feedback signals (32) and information signals (19) in accordance with the present invention.

As indicated in FIG. 3B, feedback signals 32 also originate at receivers 16 in response to transmission of information signals 19 by transmitting elements 14. In FIGS. 3, information signals 19 and probing signals 17 are shown distributed among transmitting elements 14 according to complex amplitudes 15(1,1)–15(n,m) and 13(1,1)–13(n,m), respectively, merely to distinguish between information transmission and probing modes. The distinction is not always necessary since information signals 19 may be used as probing signals 17 in certain cases. Consequently, a general set of complex amplitudes or weights $w_{11} \ldots w_{nm}$ is used unless the distinction is necessary. Similarly, while the following discussion focuses on transmission of information signals 19, except where indicated it applies equally to transmission of probing signals 17.

Signal transmission between each element 14(1)–14(n) and each receiver 16(1)–16(m) is characterized by a transmission function or gain, comprising an amplitude and phase factor. The amplitude and phase factor are typically expressed as a complex amplitude, $$a_{kj}=f_{kj}e^{i\Theta(k,j)}, \quad \text{(Eq. I)}$$

where $a_{kj}$ is the transmission factor between array element 14(k) and receiver 16(j), and $f_{kj}$ and $\Theta(k,j)$ are the corresponding amplitude and phase. Transmission functions $a_{kj}$ for each array-element/receiver pair are determined by the geometry of antenna array 12, the propagation environment through which information signals 19 are transmitted, and the locations of receivers 16. The propagation environment includes any scattering bodies located between transmitting elements 14 and receivers 16, as well as any properties of the ambient environment that affect signal transmission.

Transmission functions $a_{kj}$ are conveniently represented as the matrix elements of an n by m gain matrix, A, where n is the number of antenna elements 14 and m is the number of receivers 16. Gain matrix A characterizes the geometric properties of wireless system 50. In particular, the $j^{th}$ column of A contains transfer functions between receiver 16(j) and transmission elements 14(1)–14(n).

The amplitude of an information signal 19(j) at a given receiver 16 is determined by gain matrix A and the manner in which the information signal 19(j) is distributed among transmitting elements 14. This distribution is specified by the set of complex amplitudes $w_{11} \ldots w_{nm}$ discussed previously, where for example $w_{kj}$ represents the amplitude and phase with which information signal 19(j) is applied to transmitting element 14(k). Accordingly, complex weight $w_{kj}$ is defined as:

$$w_{kj}=b_{kj}e^{i\Phi(k,j)}, \quad \text{(Eq. II)}$$

where $b_{kj}$ is the amplitude and $\Phi(k,j)$ is the relative phase with which information signal 19(j) is applied to transmitting element 14(k). Complex weight $w_{kj}$ is $(kj)^{th}$ element of weight matrix W, and the $j^{th}$ column of matrix W corresponds to weight vector $w_j$, which characterizes the complex amplitudes with which probing signal 17(j) or information signal 19(j) is applied to transmitting elements 14.

In this representation, the amplitude of information signal 19(j) at the receiver 16(i) due to the transmitting element 14(k) is given by the product, $w^H_{jk} a_{ki}$ where $w^H_{jk}$ is the $(jk)^{th}$ element of a matrix $W^H$, which is the Hermitian conjugate of W. The amplitude of information signal 19(j) at receiver 16(i) due to all transmitting elements 14 is:

$$c_{ji}=\Sigma w^H_{jk}a_{ki}. \quad \text{(Eq. III)}$$

Here, $c_{ji}$ is the amplitude of information signal 19(j) at receiver 16(i) and the summation is over all transmitting elements 14(1)–14(n). For i=j, $c_{ji}$ represents the amplitude of information signal 19(j) at its intended receiver 16(j), while for (i≠j) $c_{ji}$ represents cross-talk due to information signal 19(j) at the receiver 16(i). The $c_{ji}$ taken together form the elements of a signal matrix C.

The transmission properties for wireless communication system 50 can thus be summarized as follows:

$$W^H A=C \quad \text{(Eq. IV)}$$

Here, $W^H$ is the Hermitian conjugate of the weight matrix W according to which information signals 19 or probing signals 17 are applied to transmitting elements 14, and C is the matrix representation of the resulting probing signals 17 or information signals 19 at receivers 16. For a given gain matrix A, a new weight matrix W' can be found that eliminates the off-diagonal elements of signal matrix C. In this case, equation IV becomes:

$$W'^H A = I, \quad \text{(Eq. V)}$$

where, I is the identity matrix.

The present invention facilitates diagonalization of signal matrix C by extracting information about the propagation environment from feedback signals 32 generated by transmission of selected probing signals 17 in accordance with weight matrices W. Information conveyed by feedback signals 32 can then be used to determine weight matrix W' of equation V. Information signals 19 transmitted according to weight matrix W' ideally will have no cross-talk.

In one embodiment of the invention, measurements of feedback signals 32, which are produced by probing signals 17 according to a selected weight matrix W, can be used to explicitly determine gain matrix A. Once A is established, the weight matrix W' of equation V is given by the pseudo-inverse:

$$W' = A(A^H A)^{-1}, \quad \text{(Eq. VI)}$$

where $A^H$ is the Hermitian conjugate of A. Provided $n \geq m$, weight matrix W' determined via equation VI will generate a complimentary null beampattern.

Determination of gain matrix A from feedback signals 32 is facilitated by using a probing weight matrix W with elements 13(1,1) ... 13(n,m) having all components zero except for 1s in the diagonal position. Each column of W is a weight vector $w_j$ which picks out a corresponding row of gain matrix A. In this method, each transmitting element 14 of array 12 is successively excited by a single probing signal 17, and the response at all receivers 16 is measured and fed back for each excitation. Sequential application of each weight vector $w_j$ allows sequential measurement of each row of gain matrix A, because signal matrix C equals gain matrix A in this case. Once gain matrix A is in hand, the weight matrix W' for information signals 19 that diagonalizes C can then be determined from equation VI.

An alternative embodiment of the invention, weight matrix W' can be determined directly from weight matrix W of probing signals 17 and the measured signal matrix C. Since the product of signal matrix C with its inverse $C^{-1}$ is the identity matrix I, weight matrix W' is given by the formula $W' = W(C^{-1})^H$.

Variations of these method are possible using different techniques to distinguish weight vectors $w_j = 13(1,j) \ldots 13(n,j)$. For example, instead of transmitting each weight vector $w_j$ in turn, they may be transmitted simultaneously, using a different transmission frequency for each weight vector $w_j$. In general, any of the time, frequency, or code multiplexing methods may be used to distinguish transmission according to different weight vectors $w_k$. In addition, probing signals 17 may be transmitted simultaneously with information signals 19 using any of the above methods.

The elements of signal matrix C provided by feedback signals 32 will include noise. Thus, the accuracy with which A and subsequently W' are determined can be improved by accumulating feedback signals 32 over a series of probing sequences, and determining the matrix elements of A from a least squares fit to a collection of signal matrices C. Moreover, it is possible to use a probing weight matrix W other than the identity matrix.

Other algorithms exist for adjusting weight vector W without first determining gain matrix A. For example, by subjecting weight matrix W to a series of perturbations, information signals 19 transmitted according to the perturbed matrix W act as probing signals 17. Feedback signals 32 generated by each perturbation of weight matrix W are then used to determine the direction in which weight matrix W should be adjusted to reduce cross-talk.

For such perturbation algorithms, cross-talk may be represented by an error function determined from information signals 19 detected at each receiver 16. For digital modulation, such error functions could for example measure the instantaneous constellation cluster variance at receivers 16 and the integrity of the signal intended for each receiver 16. Feedback of error functions for each perturbation allows estimation of the gradient of the error functions, so that weight matrix W can be incremented to produce W', which has reduced cross-talk. Other variations are possible as described for example in Widrow and Stearns, *Adaptive Signal Processing,* Prentice Hall, Englewood Cliffs, N.J. (1985), which is hereby incorporated by reference. Perturbation methods are generally simpler to implement than the explicit determination of gain matrix A, discussed above, but perturbation methods require more data and take longer to converge than methods based on determination of gain matrix A. Accordingly, they are better suited for slowly changing propagation environments.

The methods described above are also applicable if the number of information signals 19 is less than the number of receivers 16, as in the case of broadcast applications. In this case, the right side of equation V indicates which information signals 19 are intended for which receiver 16.

Methods for determining a weight matrix W in accordance with the present invention can be implemented in wireless system 50 as part of the transmission process. For example, by monitoring cross-talk during transmission of information signals 19, a redetermination of weight matrix W can be initiated whenever cross-talk increases above a preselected level. Alternatively, weight matrix W can be reoptimized at regular intervals. In either case, any of the methods described above can be used to determine the weight matrix W that generates complimentary null beampatterns for all signals 19.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for minimizing cross-talk among information signals in a wireless communication system comprising an array of transmitting elements and a collection of receivers, the method comprising the steps of:

transmitting a set of probing signals from the array according to a probing weight matrix;

feeding back from the receivers to the array in response to the probing signals a set of feedback signals measuring the cross-talk;

calculating from the feedback signals a new weight matrix that reduces the cross-talk measured by the feedback signals; and transmitting a set of new information signals according to the new weight matrix.

2. The method of claim 1 wherein the probing weight matrix is a perturbation of a selected weight matrix, and the feedback signals include error functions.

3. The method of claim 2 wherein the calculating step comprises:

computing an estimated gradient of the error functions; and obtaining the new weight matrix by adjusting the selected weight matrix according to the estimated gradient.

4. The method of claim 3 wherein the set of probing signals comprises the information signals.

5. The method of claim 4 wherein the feeding back and the calculating steps are repeated until cross-talk is substantially minimized.

6. The method of claim 4 wherein the probing signals applied to the array using a type of multiplexing chosen from the group consisting of time, frequency, and code.

7. The method of claim 1 wherein the calculating step comprises the substeps of:

determining a gain matrix from the feedback signals; and computing from the gain matrix the new weight matrix which substantially eliminates cross-talk.

8. The method of claim 7 wherein the determining substep comprises determining the gain matrix from a least squares fit to a collection of signal matrices.

9. The method of claim 8 wherein the computing substep comprises computing the new weight matrix from the pseudoinverse of the gain matrix.

10. The method of claim 1 wherein the calculating step comprises calculating the new weight matrix by multiplying the probing weight matrix by the Hermitian conjugate of the inverse of a signal matrix.

11. The method of claim 1 wherein the probing weight matrix is chosen so that each of the probing signals successively excites only one of the transmitting elements of the array.

12. A method for using feedback and spatial multiplexing to reduce cross-talk between information signals transmitted from an array of transmitting elements to a collection of receivers, the method comprising the steps of:

choosing a weight matrix W which characterizes the complex amplitudes with which the information signals are applied to the array of transmitting elements;

transmitting the information signals from the array to the receivers according to the weight matrix W;

feeding back from the receivers to the array a signal matrix C whose off-diagonal elements measure the cross-talk between the information signals;

calculating a new weight matrix W' from the weight matrix W and the signal matrix C such that a formula equivalent to $W'=W(C^{-1})^H$ is substantially satisfied; and transmitting new information signals from the array according to the new weight matrix W'.

13. The method of claim 12 wherein the calculating step comprises the substeps of:

calculating a gain matrix A from the weight matrix W and the signal matrix C using a formula equivalent to $W^H A=C$;

calculating the new weight matrix W' from the gain matrix A using a formula equivalent to $W'^H A=I$ or, equivalently, $W'=A(A^H A)^{-1}$.

14. The method of claim 12 wherein the weight matrix W is chosen so that all its elements are zero except for a diagonal collection of elements, each of which is equal to one.

15. The method of claim 12 wherein the calculating step comprises the substeps of:

calculating a gain matrix A from a least squares fit to a collection of signal matrices accumulated over time;

calculating the new weight matrix W' from the gain matrix A using a formula equivalent to $W'^H A=I$ or, equivalently, $W'=A(A^H A)^{-1}$.

16. The method of claim 12 wherein the transmitting of the information signals comprises applying each of the information signals to the array according a weight vector corresponding to a column of the weight matrix W.

17. The method of claim 16 wherein the information signals are probing signals applied to the array using a type of multiplexing chosen from the group consisting of time, frequency, and code.

18. The method of claim 12 wherein the choosing of the weight matrix comprises perturbing a selected weight matrix; and wherein the calculating step comprises using the signal matrix to determine the direction in which the weight matrix W should be adjusted to reduce cross-talk.

* * * * *

UNITED STATES PATENT AND TRADEMARK OFFICE
CERTIFICATE OF CORRECTION

| PATENT | : 5,471,647 |
|---|---|
| DATED | : Nov. 28, 1995 |
| INVENTOR(S) | : Gerlach et al. |

It is certified that error appears in the above-identified patent and that said Letters Patent is hereby corrected as shown below:

Column 3, line 27, the reference numeral "16(1)" should read --16(I)--
 (the numeral "1" in parenthesis, should be letter --(I)--).

Column 3, line 28, the reference numeral "16(1)" should read --16(I)--
 (the numeral "1" in parenthesis, should be letter --(I)--).

Column 3, line 38, the reference numeral "16(1)" should read --16(I)--
 (the numeral "1" in parenthesis, should be letter --(I)--).

Column 3, line 38, the equation "1≠j" should read --I ≠j--
 (the numeral "1", should be letter --(I)--).

Signed and Sealed this

Twenty-third Day of July, 1996

*Attest:*

BRUCE LEHMAN

*Attesting Officer*     *Commissioner of Patents and Trademarks*